(12) United States Patent  
Nikiel et al.

(10) Patent No.: US 7,181,480 B1
(45) Date of Patent: Feb. 20, 2007

(54) SYSTEM AND METHOD FOR MANAGING INTERNET STORAGE

(75) Inventors: Mark A. Nikiel, Redmond, WA (US); David Byther, Seattle, WA (US); Wei-Chung Jones Wang, Sammamish, WA (US); Michael Culver, Redmond, WA (US); Kyung Camillus Paik, Clyde Hill, WA (US)

(73) Assignee: Microsoft Corporation, Redmond, WA (US)

( * ) Notice: Subject to any disclaimer, the term of this patent is extended or adjusted under 35 U.S.C. 154(b) by 478 days.

(21) Appl. No.: 10/608,193

(22) Filed: Jun. 30, 2003

(51) Int. Cl.
*G06F 17/30* (2006.01)

(52) U.S. Cl. .................. 707/205; 707/104.1; 709/235; 711/114; 711/170

(58) Field of Classification Search ............. 707/104.1, 707/205; 709/235; 711/114, 170
See application file for complete search history.

(56) References Cited

U.S. PATENT DOCUMENTS

| | | | |
|---|---|---|---|
| 5,897,661 A * | 4/1999 | Baranovsky et al. ........ | 711/170 |
| 6,282,602 B1 * | 8/2001 | Blumenau et al. ............. | 711/4 |
| 6,324,571 B1 * | 11/2001 | Hacherl ...................... | 709/208 |
| 6,341,333 B1 * | 1/2002 | Schreiber et al. ........... | 711/114 |
| 6,457,053 B1 * | 9/2002 | Satagopan et al. .......... | 709/226 |
| 6,487,561 B1 * | 11/2002 | Ofek et al. .................. | 707/204 |
| 6,498,612 B1 * | 12/2002 | Brown et al. ................ | 715/762 |
| 6,523,036 B1 * | 2/2003 | Hickman et al. ............. | 707/10 |
| 6,591,376 B1 * | 7/2003 | VanRooven et al. .......... | 714/36 |
| 6,604,117 B2 * | 8/2003 | Lim et al. .................... | 707/200 |
| 6,604,118 B2 * | 8/2003 | Kleiman et al. ............. | 707/203 |
| 6,823,436 B2 * | 11/2004 | Krishnamurthy ............ | 711/170 |
| 6,865,655 B1 * | 3/2005 | Andersen ..................... | 711/162 |
| 7,010,144 B1 * | 3/2006 | Davis et al. ................. | 382/100 |
| 2002/0083187 A1 * | 6/2002 | Sim et al. .................... | 709/235 |
| 2003/0131002 A1 * | 7/2003 | Gennetten et al. ............ | 707/10 |
| 2003/0212660 A1 * | 11/2003 | Kerwin ........................ | 707/1 |
| 2004/0128269 A1 * | 7/2004 | Milligan et al. ............... | 707/1 |
| 2004/0143582 A1 * | 7/2004 | Vu .............................. | 707/100 |

* cited by examiner

*Primary Examiner*—Don Wong
*Assistant Examiner*—Hanh Thai
(74) *Attorney, Agent, or Firm*—Shook, Hardy & Bacon LLP

(57) ABSTRACT

A method and system are provided for allowing a user to store image data on a network. The system includes a file uploading component for uploading an image file from each user to the storage system, and for deriving an image metadata set related to the uploaded image file. The system also includes a plurality of database storage facilities for storing each image metadata set. Each database storage facility including at least two logically partitioned sections. The system additionally includes a file management component for managing data storage in order to store each image metadata set in more than one logically partitioned section and in more than one database storage facility, and for directing the image file to an image storage facility.

35 Claims, 6 Drawing Sheets

DISTRIBUTED DATABASE 40

42  44  46

48  50  52

SYSTEM AND METHOD FOR MANAGING INTERNET STORAGE

CROSS-REFERENCE TO RELATED APPLICATION

Not applicable.

STATEMENT REGARDING FEDERALLY SPONSORED RESEARCH OR DEVELOPMENT

Not applicable.

FIELD OF THE INVENTION

Embodiments of the present invention relate to storage systems and in particular to storage systems for managing image storage and sharing of images over a network.

BACKGROUND OF THE INVENTION

In recent years, digital photography and computerized image storage have become increasingly popular. Images typically require a large amount of storage space. Accordingly, storage systems for computerized images have become available over the Internet, thereby minimizing storage consumption by images on individual computer systems.

Such storage systems are often adapted to accommodate the sharing of images over the Internet with multiple users. A central service can provide individuals with storage for images and upon receiving approval from those individuals, can allow other authorized individuals to view the images. Currently available systems allow users to store photographs by visiting a web site and uploading images. One available web site includes a data management system that monitors storage on a per user basis using an extensible markup language (XML) file. As the number of users increases, such a storage system suffers from performance defects. Furthermore, when the amount of storage space becomes inadequate and requires expansion, the system lacks scalability and its performance suffers.

Although keeping track of storage space on a per user basis with XML files is simple, the technique has proven to be inefficient. Upon experiencing extensive use, the XML files become burdensome and require additional storage space. System processing units become very busy, memory usage becomes excessive, and performance becomes inadequate. Another disadvantage of the XML technique is that when a user wants to retrieve only one piece of data, the system is required to parse the entire XML file to locate the data.

Some of these inadequacies can be remedied by increasing system hardware. Another possible solution involves moving from XML to a binary format. However, both of these solutions suffer from other disadvantages.

Accordingly, a new solution is needed for storing images and making the images available for sharing over a network. A system for storing images is needed that is readily scalable to accommodate the needs of a growing number of users. Furthermore, a storage system is needed that is secure, robust, and extensible.

SUMMARY OF THE INVENTION

In one aspect, the invention includes a database storage system for providing storage for metadata sets. Each metadata set is related to a file uploaded by a user over a network. The database storage system comprises a plurality of database storage facilities for storing the metadata sets, each storage facility comprising at least two logically partitioned sections. The database storage system additionally includes a file management component for managing metadata storage in order to store each metadata set in more than one logically partitioned section and in more than one database storage facility.

In a further aspect, the invention includes a method for providing storage for metadata sets, wherein each metadata set is related to a file uploaded by a user over a network. The method includes dividing a plurality of database storage facilities into at least two logically partitioned sections. The method additionally includes managing metadata storage in order to store each metadata set in more than one logically partitioned section and in more than one database storage facility.

In an additional aspect, a network storage system provides storage space for multiple users. The system includes a file uploading component for uploading an image file from each user to the storage system and for deriving an image metadata set related to the uploaded image file. The system additionally includes a plurality of database storage facilities for storing each image metadata set, each database storage facility including at least two logically partitioned sections. The system also includes a file management component for managing data storage in order to store each image metadata set in more than one logically partitioned section and in more than one database storage facility, and for directing the image file to an image storage facility.

In a further aspect, a method is provided for storing user data for multiple users using a network storage system. The method includes uploading a data set including an image file from a user to the storage system and deriving image metadata from the data set. The method also includes storing the image metadata in logically partitioned sections of database storage facilities and managing the image metadata such that each image metadata set is stored in more than one logically partitioned section and in more than one storage facility. The method additionally includes directing the image file to an alternate storage facility.

BRIEF DESCRIPTION OF THE DRAWINGS

Embodiments of the present invention are described in detail below with reference to the attached drawing figures, wherein.

DETAILED DESCRIPTION OF THE INVENTION

Figure 1:
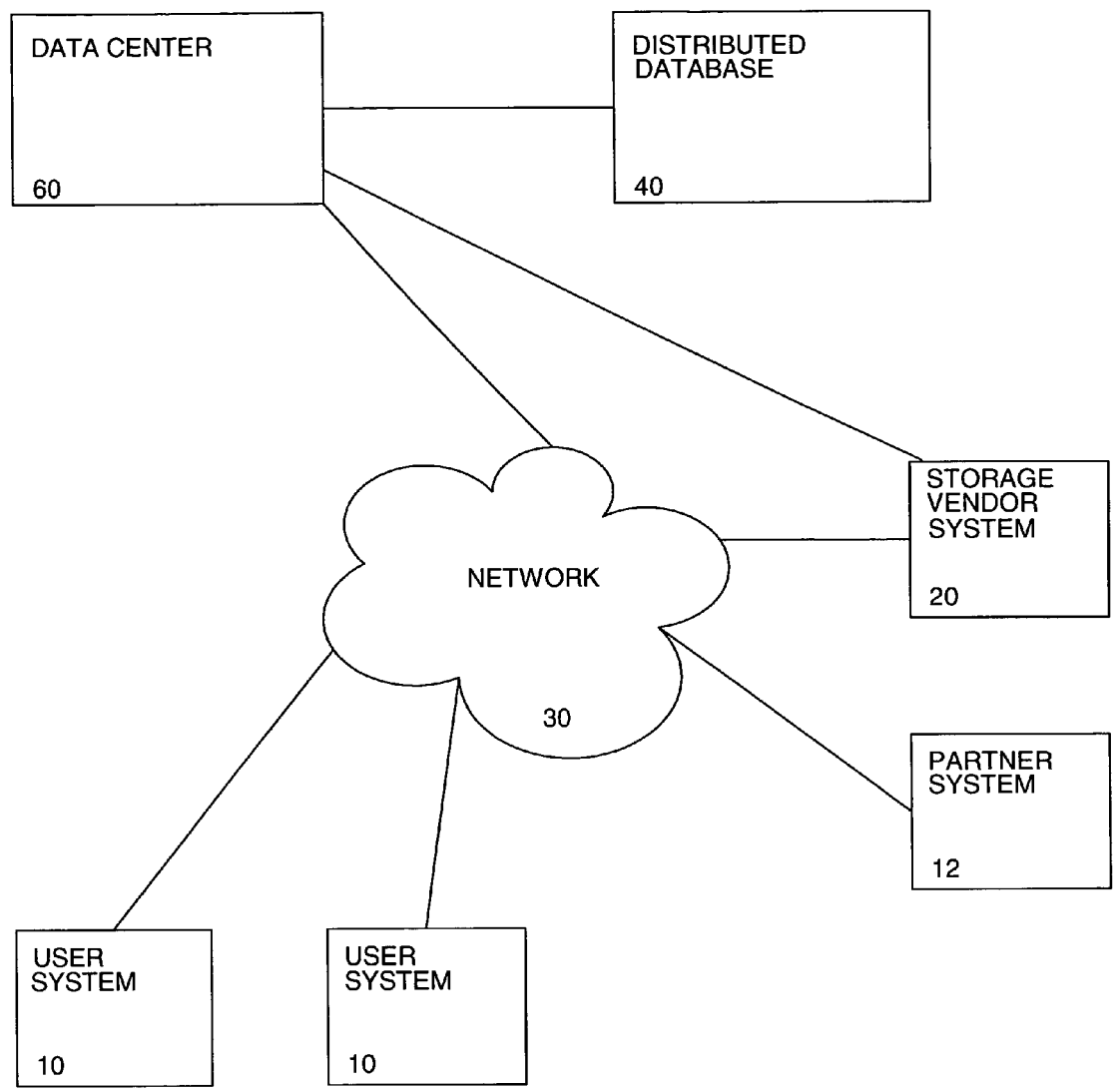
FIG. 1 is a block diagram showing a system of the invention.

The invention relates to an extensible and scalable storage system for sharing images over a network such as the Internet. The system may additionally be used for online purchasing of gifts and prints containing those images. FIG. 1 illustrates an image storage system in accordance with an embodiment of the invention. The system includes a data center 60 that is able to communicate over a network 30 with multiple user systems 10 operated by multiple users. The data center 60 additionally communicates with a database 40. A storage vendor system 20 and a partner system 12 may also communicate over the network 30 with the data center 60. The storage vendor system 20 may be connected to the network 30, to the data center 60 or to both the network 30 and the data center 60.

The database 40 may be used for image metadata storage. Although the database 40 is shown as a unit, it may include a distributed database configuration including a plurality of physical machines. Furthermore, the machines may be situated at separate and distinct locations. The database is preferably a standard query language (SQL) database. One or more user systems can access the SQL database 40 simultaneously.

The storage vendor system 20 may include tools for communicating with the data center 60 and one or more computing devices in one or more locations accompanied by one or more storage facilities in each location. The storage vendor system 20 will typically provide storage space for images. Image metadata stored in the database 40 may assist a user system 10 in locating an image stored by the storage vendor system 20.

The data center 60 may include components for directing information to and from the database 40 and the storage vendor system 20. The data center 60 is further explained below with reference to FIG. 4. The user systems 10 may typically include personal computing devices capable of uploading images to the data center 60 and retrieving images or other information through the data center 60.

The partner system 12 may include or be operated by a merchant capable of affixing images to objects such as articles of clothing or other items that can be made available for purchase. The partner system 12 may alternatively include a photograph shop capable of sending prints of uploaded images. The user systems 10, data center 60, storage vendor system 20, partner system 12, and distributed database 40 may all include one or more computing devices. A configuration of the computing devices in accordance with an embodiment of the invention is described below with reference to FIG. 2.

Figure 2:
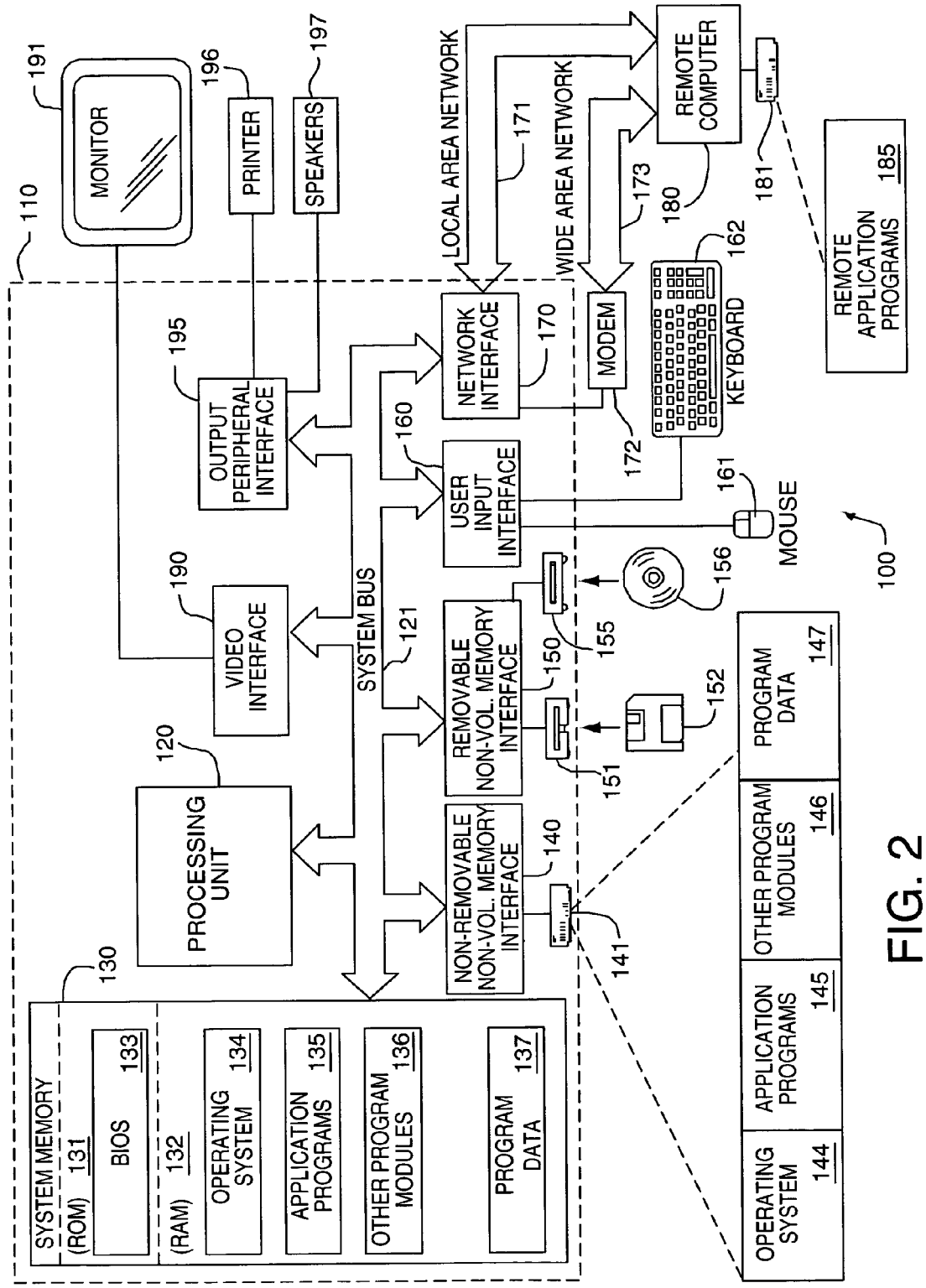
FIG. 2 is a block diagram of a suitable computing system environment for use in implementing embodiments of the present invention.

FIG. 2 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system 100 for implementing the invention includes a general purpose-computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/nonremovable, volatile/nonvolatile computer storage media. By way of example only, FIG. 2 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in embodiments of the present invention may operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. LAN 171 and/or WAN 173 can be wired, wireless, or a combination thereof.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with embodiments of the present invention.

Figure 3:
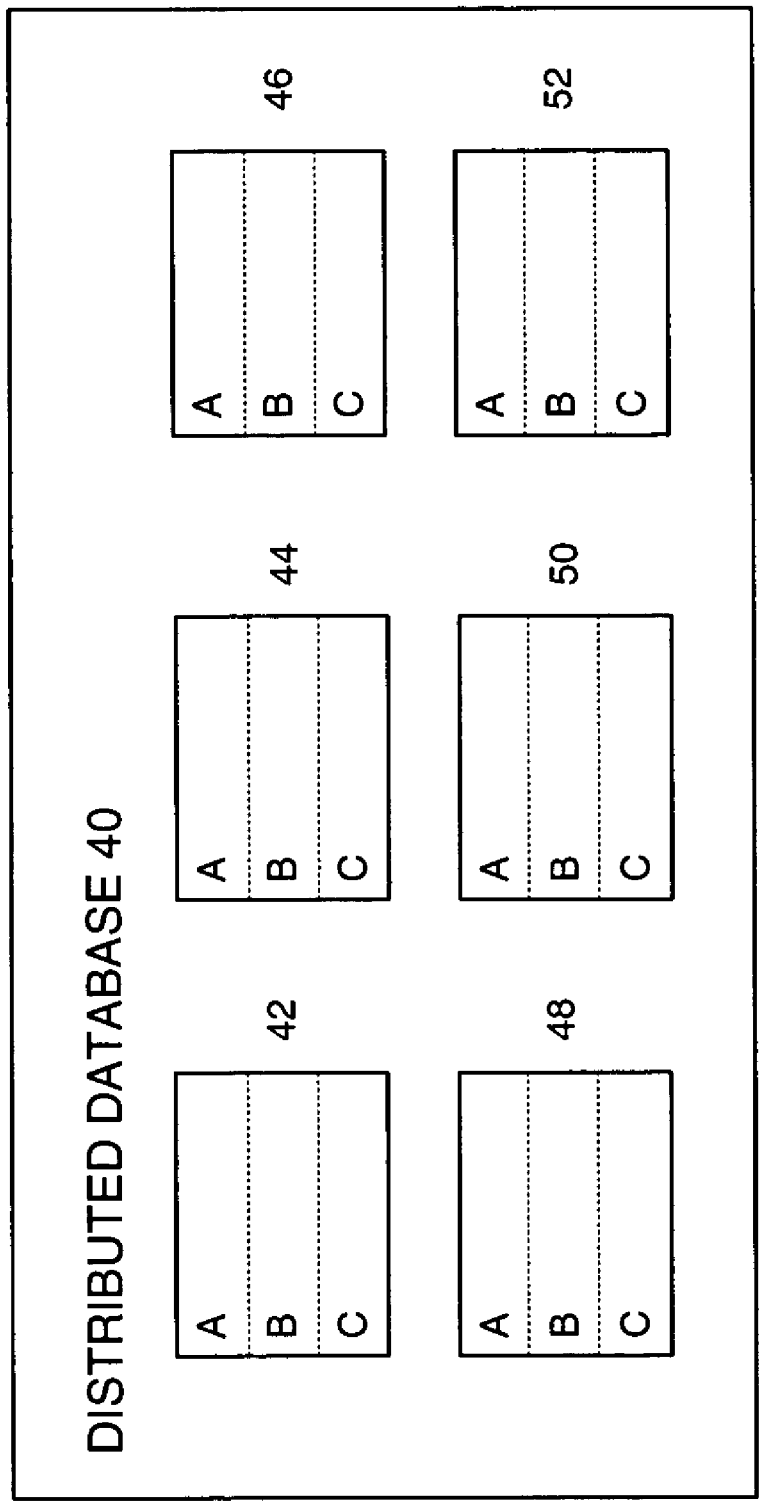
FIG. 3 is a block diagram illustrating a database configuration in accordance with an embodiment of the invention.

FIG. 3 illustrates components of the database 40 in accordance with an embodiment of the invention. The database 40 preferably includes a plurality of physical machines or SQL boxes or machines 42, 44, 46, 48, 50, and 52. The specific number of machines shown is merely exemplary and is not limiting. The SQL machines 42, 44, 46, 48, 50, and 52 may include one or more logical partitions. In the displayed embodiment, the machines each include three logical partitions A, B, and C. Data sets that include image metadata are stored in the database 40. The data sets are partitioned across the multiple SQL machines, with each partition mirrored on multiple other machines. For example, if a first data set is uploaded by a user and is stored in section A of the machine 42, the first data set will be copied by data center 60 and stored within a section of another physical machine. Accordingly, the first data set may also be stored in a location such as section B of the SQL machine 44 and section C of machine 46. Various metadata distribution patterns are further described below.

Figure 4:
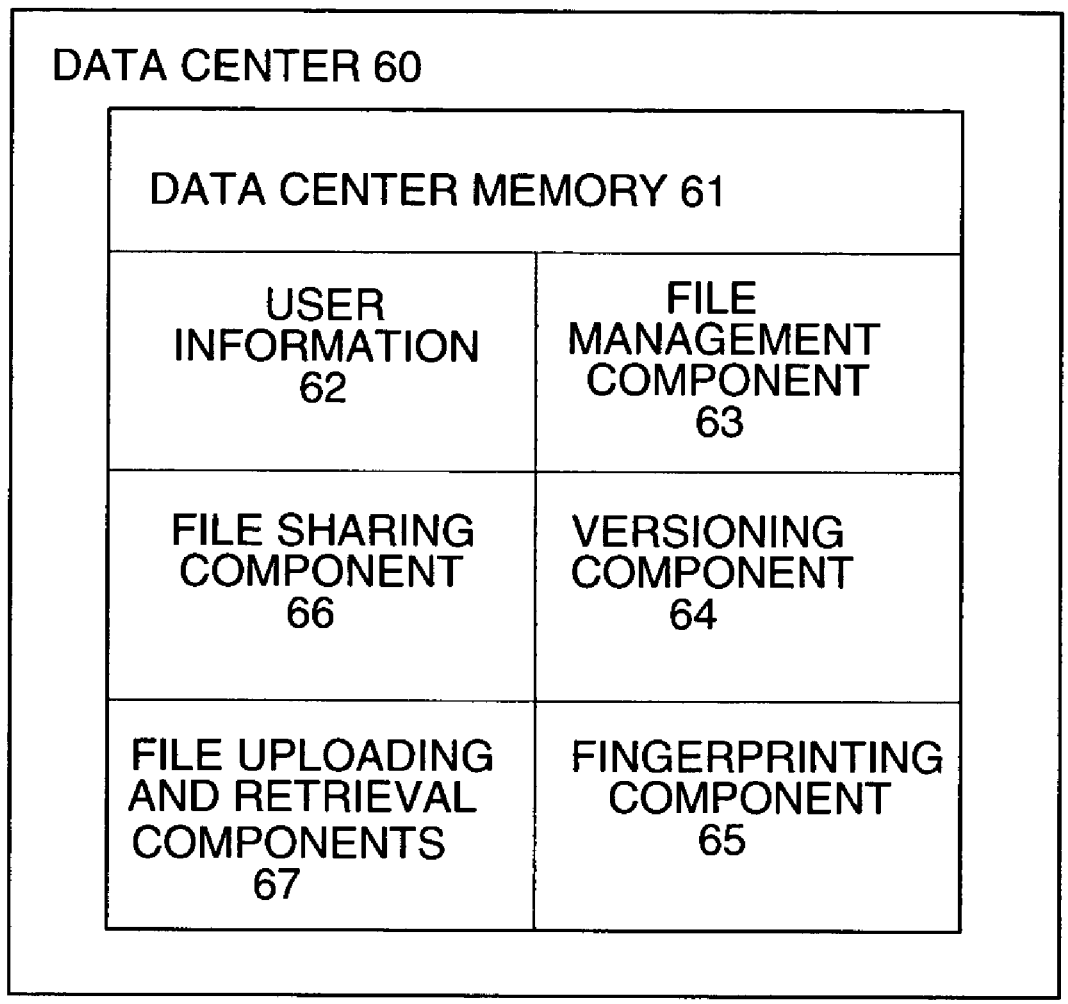
FIG. 4 is a block diagram illustrating components of a data center in accordance with an embodiment of the invention.

FIG. 4 illustrates components of the data center 60 in accordance with an embodiment of the invention. The data center 60 preferably includes processing components as described above with reference to FIG. 2 and further includes a data center memory 61. The data center memory 61 includes components for facilitating interaction with the database 40, the storage vendor system 20, and the partner system 12. Specifically, the data center memory 61 may include a user information component 62, a file management component 63, a versioning component 64, a fingerprinting component 65, a file sharing component 66, and file uploading and retrieval components 67. Each of these components is further described below.

The data center 60 is able to achieve scalability with the database 40 by adding a new SQL machine to the system, and then rebalancing the data using the file management component 63. The data center 60 can achieve robustness by moving uploaded data from one machine to another and by selecting a mirror to be the primary data source with minimal downtime. The data center 60 uses the file management component 63 to achieve redundancy and extensibility through selecting a data distribution pattern.

The metadata distribution pattern may be determined by a hashing function within the file management component 63 for providing an optimization for determining which machine will receive information. In an exemplary embodiment, the hashing function involves hashing down to 320 buckets based on a specific user identified by a Passport user identifier (PUID) or other identifier. The PUID or other identifier is a primary key uniquely identifying a specific user. Based on the hash function, the file management component knows which SQL machine will receive information. However, even absent such a technique, the mirroring could occur in any physical location to achieve the various objectives of the invention. Furthermore, in the event that mirroring or further uploading is required and the SQL machines are filled, the data center 60 may add another SQL machine.

On an individual machine level, within each machine of the database 40, a copy of metadata information from another SQL machine is stored. This redundancy creates reliability by providing for backup if a machine is out of commission. By increasing the number of copies of original data and storing each copy of the original data on a different machine, the reliability of the system is increased.

In the embodiment illustrated in FIG. 3, each machine has three logical partitions. In an embodiment of the invention, the system includes a total of "n" machines, wherein a first machine is labeled machine $M(x_0)$ and the last machine in the sequence is machine $M(x_{n-1})$. The system may place an original data set on a machine $M(x)$ within the system. In order to achieve the desired redundancy, the system may place a copy on machine $M(x+1)$ and another copy on machine $M(x+2)$. If machine $M(x)$ or $M(x+1)$ is the same as $M(x_{n-1})$, the final machine in the series, then the system will return to place the next copy on the first machine in the series $M(x_0)$ and begin the process again until each logical partition within the each machine in the system is full. Thus, if a machine $M(1)$ is the first machine in the series $M(x_0)$, it may include: (1) $M(1)$'s original data; (2) a copy of $M(x_{n-1})$'s original data; and (3) a copy of $M(x_{n-2})$'s original data. Machine $M(2)$ may include: (1) $M(2)$'s original data; (2) a copy of $M(1)$'s original data; and (3) a copy of $M(x_{n-1})$'s original data. A machine $M(3)$ may include: (1) $M(3)$'s original data; (2) a copy of $M(2)$'s original data and (3) a copy of M(1)'s original data. Thus, every machine M(x) may include it's own original data and copies of the original data in machines M(x−1) and M(x−2), where if x is equal to "$x_0$", then x−1 is set to n. In some instances more machines may be added to accommodate additional data. Although the system shown in FIG. 3 includes three logical partitions within each machine, other numbers of logical partitions could also be used. In on preferred embodiment, original data is stored in the first section A of each machine and copies are stored in other logically partitioned sections.

Each metadata set may be retrieved by the file uploading and retrieval components 67 from one location in the database 40. In one implementation, one copy of each data set exists in "read/write" format. This copy will initially be the originally uploaded data. The mirrored data stored on other SQL machines may be stored in "read only" format. However, the data center 60 can promote SQL machines from "read only" to "read/write". In a preferred implementation, each data set is stored in the database 40 three times, once in "read/write" format, and twice in "read only" format. Accordingly, even if two SQL machines become unavailable, the database 40 will still be able to provide necessary user information. In the displayed embodiment, since two machines can become unavailable without impairing system functionality, redundancy is built into the system.

The file management component 63 can make modifications to the system database 40 in an atomic manner. Specifically, modification of a piece of data in one file will result in consistent modification of that piece of data throughout the entire system. Every modification may be global, such that if a modification succeeds, it succeeds on all SQL machines and if it fails, it fails on all SQL machines.

Through the data center 60, on a user level, the system maintains a user information component 62 that may include information such as subscription data, access control information, locale, last login information, and user's email. Metadata storage is based on a user's identifier that is stored in the user information component 62.

Figure 5:
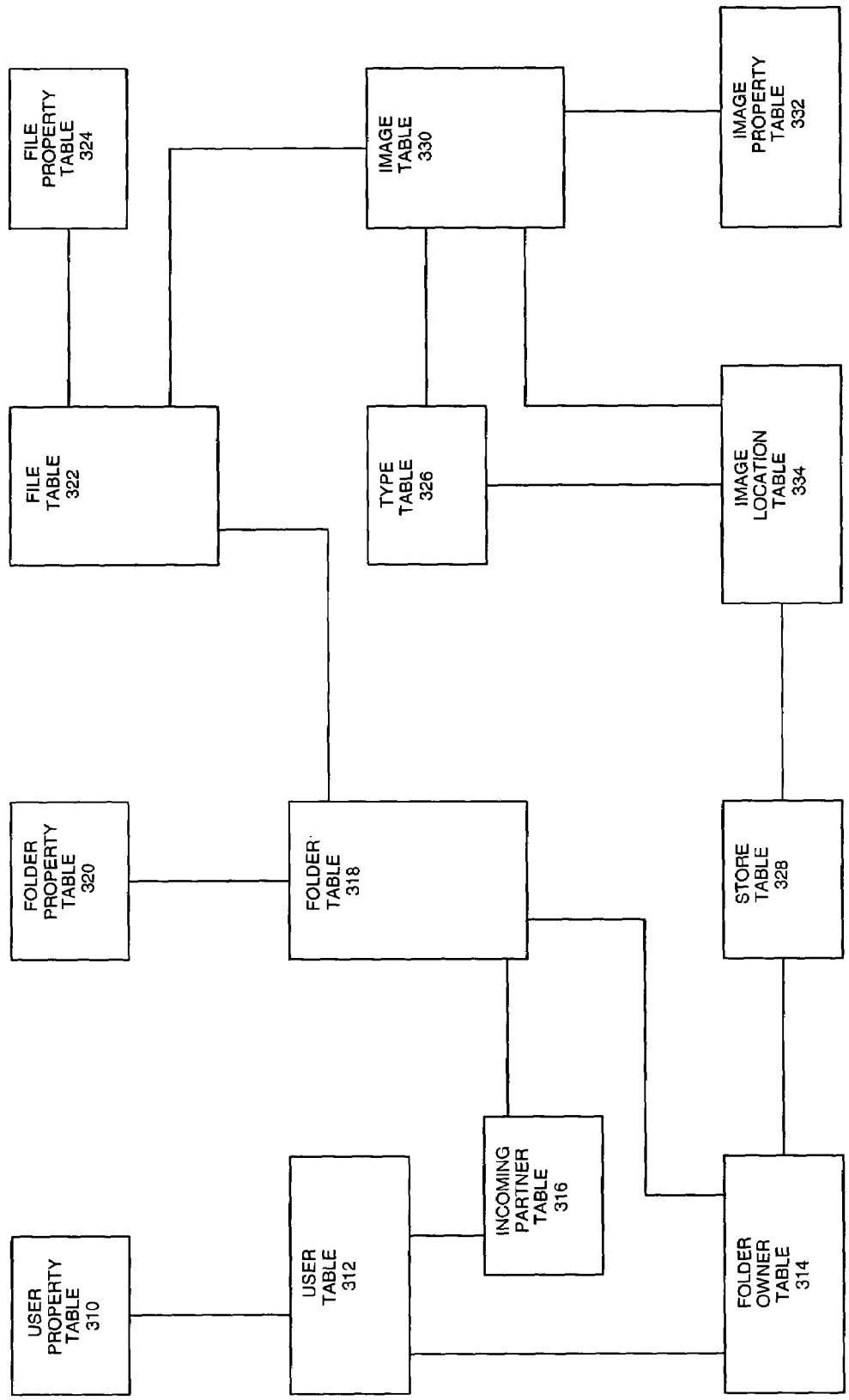
FIG. 5 is a block diagram illustrating a filing system in accordance with an embodiment of the invention.

The file metadata stored in the database 40 is stored physically in a directory hierarchy that is transparent to the user. An exemplary hierarchy is shown in FIG. 5. This layer of abstraction hides details about file system performance characteristics and limitations from users. Users can place any number of "files" in a single "folder". Users may also place any number of "sub-folders" within a "parent folder" to create a hierarchy as deep as they wish. Users can choose folder name and description they wish. Characters, such as Unicode characters, are used to allow users a vast amount of flexibility. Users can organize files and folders in various orders within their parent's folder that the user chooses.

File metadata is logically subdivided into a number of unique stores that allow variation of characteristics such as expiration policy, quota, and placement of the physical files. Expiration can be performed on a per file basis, per folder basis or per user basis. Various units of time may be used to determine expiration and an undetermined duration may also be allowed. The system can include quotas that limit the amount of available storage space on a per user basis. The quotas can be enforced at regular intervals, such as on a per day basis, or without regard for time. Individual users can be granted additional quota capacity on a per store basis.

As set forth above, the image files can be placed in various physical locations using a plurality of independent storage providers 20. The file management component 63 may include a location function. The location function may place a file based on variables such as store type, file type, and/or user locale. Weights may be applied to select or exclude a predetermined physical location. The weight attribute of the location function can be turned off, thereby preventing new files from being added to the specified physical location. Each user can have file data in any or all of the aforementioned "stores". Once a file is placed somewhere, it can instantly be found again with the file uploading and retrieval components 67 without concern for the variability of the location function.

Communication with storage vendor systems 20 is optimally entirely flexible. The user 10 may have one file that is stored on a system that is accessible via web-based distributed authoring and versioning, an extension to hypertext transfer protocol (HTTP/DAV) only, another file that the user 10 sees as being in the same folder can be physically elsewhere in the world, stored with a different company and accessible via different technology, such as universal naming convention/common Internet file system (UNC/CIFS), in which UNC is a location protocol and CIFS is a commonly used transfer protocol. The user will not be aware of the actual storage location.

Individual files and folders can be identified as being shared with other users using the file sharing component 66. If the file owner turns off sharing, then no one but the owner can view the file. If sharing is turned on, the system keeps track of how many times a specific file/folder has been shared. In an embodiment of the invention, non-owners of the file/folder can view content only if they know the correct sharing ID. In order to share a file with a first visitor, the user may send the first visitor an encrypted link to the file within an email message and the first visitor is able to view the file successfully through the link. If the user wants to stop sharing the file with the first visitor, the system can invalidate or lock the link or version of the link to terminate sharing. The link received by the first visitor will no longer access the file. The user may then decide to share that same file a second time with a second visitor. The second visitor receives a link to the file and can view it successfully. The first visitor will not be able to see the file again because the link that the first visitor had was valid only for the first sharing instance.

The storage vendor systems 20 can store multiple versions of an image file using the versioning component 64 and can accomplish this transparently to the user. Additional versions may be optimized for use in different contexts. For example, one version may be a thumbnail version for quick viewing. The user does not need knowledge that multiple versions are stored. The user's storage quota may be impacted only for the original file and not for the other versions created for optimization needs. In an embodiment of the invention, three different sizes of images such as 1M, 50K, and 2K images are stored. The larger files could be used for shopping with partner systems 12 and local printing. The smaller files could be used for quick viewing. For various applications, the user may be able to optimize the fit within a specific aspect ratio. The storage of three different versions minimizes download time and load on servers.

The data center 60 may cache a universal resource locator (URL) to each of the unique versions of a file for quicker access. This URL has a configurable timestamp associated with it. The data center 60 or the storage vendor system 20 determines this URL on an as-needed basis to minimize the overhead in calculating this URL. Each created URL may be given an expiration date.

The fingerprinting component 65 associates a digital fingerprint with every file. The system can guarantee that the file that the user sent is the file that was actually received. The system can further guarantee that the stored file as last modified is the same file that is obtained when the user wants to see it again. The fingerprinting component 65 can determine if a file being uploaded already exists in a user's account by comparing the calculated fingerprint to a stored fingerprint. If the fingerprints match, the file has already been stored. There is no need to incur the cost of storing the same file twice. The fingerprint may be calculated using the MD5 or other hash function that will not generate the same hash result from multiple distinct input streams.

As set forth above, FIG. 5 illustrates a metadata file system in accordance with an embodiment of the invention. In the system of the invention, seemingly random information can be stored on a per user, per folder, file or image basis. The participants in the system have variously defined rights and responsibilities. In an embodiment of the invention, at a minimum, the user maintains access control. A user may function as the folder owner who keeps track of quotas and expirations. The folder owner can change policies depending on the identity of the partner system 12.

The file system may include a user table 312 having an associated user property table 310. A folder owner table 314, a folder table 318 and a folder property table 320 are connected with the user table 312. An incoming partner table 316 is also connected with the user table 312. A file table 322 and associated file property table 324 are connected with the folder table 318. An image table 330 and associated image property table 332 are connected with the file table 322. An image location table 334 and a type table 326 may be connected with the image table 330. A store table 328 may exist between the image location table 334 and the folder owner table 314. Each of these tables is further described below.

All of the tables typically include a variable column and a type associated with each variable in the variable column. The user table 312 may include an identifier variable such as a PUID or other identifier, most recent folder stored, most recent folder modified, last login date, email address, user locale, date of last update, hash bucket, a next modification identifier, a subscription or security identifier, and an access control variable. These variables may be of various types such as integer types, large integer, small integer, string, and character types. These types and variables are merely exemplary and other types and variables may be included. Access to the user table 312 may be obtained through the identifier variable or other similar identifier.

The user property table 310 preferably includes an identifier variable, a fix up identification variable, a last update variable, and a hash bucket variable. The fix-up identification variable may include a counter used to generate user-unique file and folder names. After each use, the fix-up ID value can be incremented in preparation for subsequent use. The user property table 310 may also include a property name variable and a property value variable. Access to the user property table 310 may be obtained through the identifier variable.

The images stored by the user 10 are identified by the data in the image table 330, the type table 326, the image property table 332 and the image location table 334. The image table 330 may include an identifier variable, a store variable, a file fix up identification variable, and a type variable. The data in the image table may be accessed through these variables. Further variables in the image table 330 may include an image location variable, a cyclic redundancy code (CRC) variable, a size variable, an expiration clock start variable, a revision variable, a next revision variable, a height variable, a width variable, a format variable, a URL variable, a last update variable, and a hash bucket variable. The image property table 332 typically will include the same variables as those described above with reference to the user property table 310, but may also include a store variable, a file fix up variable, and a type variable. The image location table 334 provides an indication of where an image is physically located. The image location table 334 may include an image location variable, a store variable, a type variable, a weight variable, a path variable, a user data variable, a locale variable, a last update variable, and a hash bucket variable.

The type table 326 is connected with the image location table 334 and the image table 330 and may include a type variable, a description variable, an aggregate variable, a last update variable, and a hash update variable. The type table 326 may also include other variables.

The images are stored within files that are identified by the file table 322 and the file property table 324. The file property table 324 may include the same variables as the user property table 310, but may additionally include a store variable pertaining to the storage location of the file. The file table 322 may include a user identifier variable, a store variable, a fix up ID variable, and a folder fix up ID variable. The file table 322 may additionally include file name, caption, and description variables. The file table 322 may additionally include variables for keeping track of events such as a creation date and a modification date variable. The file table 322 may include a user count variable for counting users accessing the file, and a sharing ID for regulating file sharing. The file table 322 may additionally include a lock writing variable for allowing a file to be locked. A lock expiration variable and a clock start variable can control lock duration. The file table 322 may further include a size variable, a path variable, a hash bucket variable, and a flag deletion variable. Other variables may also be included.

The files are stored in folders identified by the folder table 318 and the folder property table 320. The folder property table 320 may include folder property variables paralleling the file property variables described above with relation to the file property table 324. The folder table 318 may include an identifier variable, a store variable, a fix up ID, and a parent fix up ID. The folder table 318 may additionally include folder name and description variables, and theme name and theme location variables. The folder table 318 may further include a partner ID, a customer ID, an order ID, and a sharing ID. A creation date variable and an update date variable may track time sensitive information. The folder table 318 may also include additional variables.

The folder owner table 314 preferably includes the identifier variable, a store variable, a quota variable, a size variable, a delete flag variable, a last update variable, and a hash bucket variable. The quota variable and the size variable may be used by the folder owner or partner system 12 to regulate storage space. The additional variables are substantially as described above. Other variables may also be included.

The store table 328 may include a store variable, a store name variable, a quota variable, a days until expiration variable, a last update variable, and a hash bucket variable.

The incoming partner table 316 may include an identifier variable, a partner identifier variable, and a last update variable. The incoming partner table 316 may also include a hash bucket variable.

Figure 6:
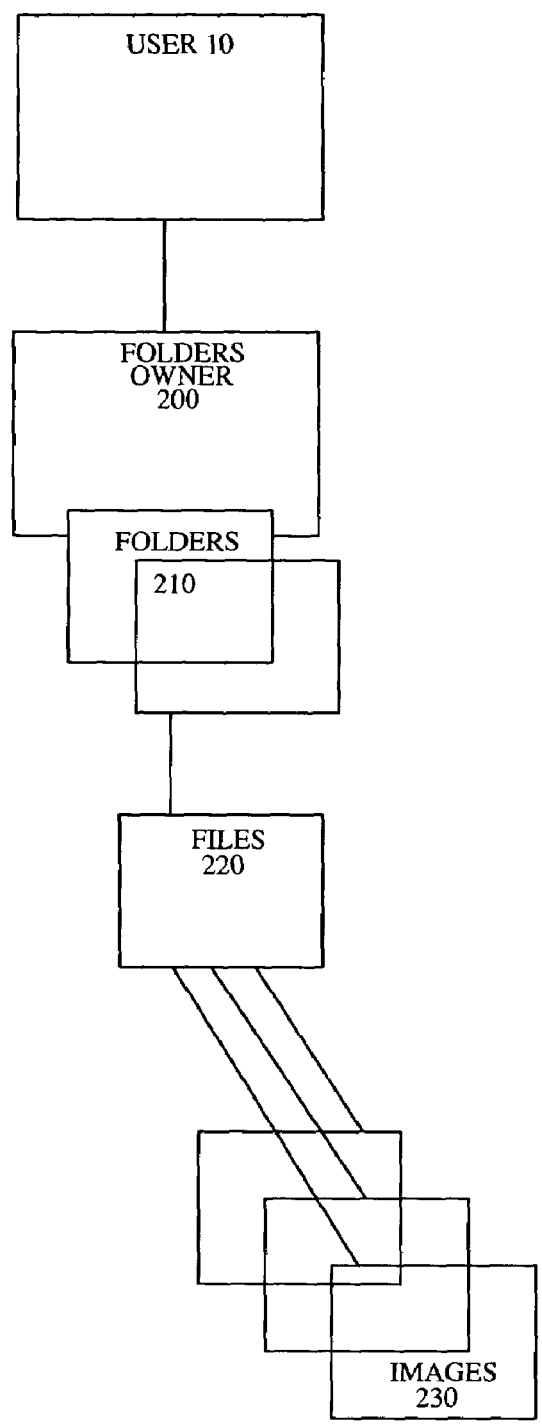
FIG. 6 is a block diagram illustrating a user retrieval process in accordance with an embodiment of the invention.

FIG. 6 illustrates a process by which the user of a user system 10 obtains images. The user typically goes to a menu and queries the database 40. The data center 60 will recognize the user based on the user's personal identifier, stored with user information component 62, and will query using the file uploading and retrieval component 67 based on the specific user. This query process generates a web page with folders and files specifically for user. The user accesses a folder owner table 200 to obtain folder 210. The folders 210 include files 220. The files 220 include a plurality of images 230. The user enters a personal identifier in order to gain access and the personal identifier is able to link the user to the appropriate folders. The data center 60 generates a page structure for the displayed information.

When the user wants to add a new file, the user loads the file through the user interface of the data center 60. The data center 60 obtains information about data files from the user and ships the metadata to database 40 and the files to the storage vendor system 20 or other actual location where the files are actually located.

The system as described above gives users the ability to share images and make purchases of image bearing products, such as t-shirts or postcards, over a network. The system provides and manages storage to facilitate this functionality. The external partner systems 12 may be provided with all necessary storage and information. The external partner systems 12 may be provided with the high-resolution version of images or other versions of images they require. The data center 60 can modify policies depending on the specific partner system 12.

Embodiments of the present invention have been described in relation to particular embodiments, which are intended in all respects to be illustrative rather than restrictive. Alternative embodiments will become apparent to those skilled in the art to which the present invention pertains without departing from its scope.

From the foregoing, it will be seen that this invention is one well adapted to attain all the ends and objects set forth above, together with other advantages, which are apparent and inherent to the system and method. It will be understood that certain features and sub-combinations are of utility and may be employed without reference to other features and sub-combinations. This is contemplated and with the scope of the claims.

We claim:

1. A database storage system for providing storage for metadata sets, each metadata set related to a file uploaded by a user over a network, the database storage system comprising:
    a plurality of database storage facilities for storing the metadata sets, each database storage facility comprising at least two logically partitioned sections, wherein the file is directed to at least one alternate database storage facility and at least one database storage facility stores a first original metadata set in one logically partitioned section of the at least one database storage facility and stores a copy of a second original metadata set, the second original metadata set located in another database storage facility, in another logically partitioned section of the at least one database storage facility, such that storing the first original metadata set and the copy of the second original metadata set is based on an user identifier; and
    a file management component for managing metadata storage in order to store each metadata set in more than one logically partitioned section and in more than one database storage facility.

2. The database storage system of claim 1, further comprising file uploading and retrieval components for uploading files from the users and for retrieving the files and the metadata sets from the storage system.

3. The database storage system of claim 1, wherein the uploaded files are image files and the metadata sets are image metadata sets.

4. The database storage system of claim 1, further comprising a directory hierarchy that is transparent to the users.

5. The database storage system of claim 1, further comprising a digital fingerprinting component for fingerprinting each uploaded file.

6. The database storage system of claim 1, further comprising a file sharing component for allowing visitors to view the uploaded file.

7. The database storage system of claim 1, further comprising external storage space provided by a storage vendor system for storing uploaded files.

8. The database storage system of claim 1, further comprising a partner system for incorporating uploaded image files in a product.

9. A method for providing storage for metadata sets for multiple users, each metadata set related to a file uploaded by a user over a network, the method comprising:
    dividing a plurality of database storage facilities into at least two logically partitioned sections;
    storing an original metadata set in a logically partitioned section of at least one of the plurality of database storage facilities, wherein storing the original metadata set is based on an user identifier;
    storing a copy of an original metadata set located in another database storage facility of the plurality of database storage facilities in another logically partitioned section of the at least one database storage facility, wherein storing the copy of the original metadata set located in the another database storage facility is based on the user identifier;
    managing metadata storage in order to store each metadata set in more than one logically partitioned section and in more than one database storage facility; and
    directing the file to an alternate database storage facility.

10. The method of claim 9, further comprising uploading files from the users and retrieving the files and the metadata sets from the storage system.

11. The method of claim 9, further comprising receiving image files from the users and deriving image metadata sets.

12. The method of claim 9, further comprising a providing a directory hierarchy that is substantially transparent to the users.

13. The method of claim 9, further comprising performing digital fingerprinting on each uploaded file.

14. The method of claim 9, further comprising a providing a file sharing component for allowing visitors to view the uploaded files.

15. The method of claim 9, further comprising storing uploaded files in external storage space provided by a storage vendor system.

16. A computer-readable medium having computer-executable instructions for performing the method recited in claim 9.

17. A network storage system for providing storage space for multiple users, the system comprising:
    a file uploading component for uploading an image file from each user to the storage system, and for deriving an image metadata set related to the uploaded image file;
    a plurality of database storage facilities for storing each image metadata set, each database storage facility including at least two logically partitioned sections, wherein the image file is directed to at least one alternate database storage facility and at least one database storage facility stores a first original image metadata set in one logically partitioned section of the at least one database storage facility and stores a copy of a second original image metadata set, the second original image metadata set located in another database storage facility, in another logically partitioned section of the at least one database storage facility, such that storing the first original image metadata set and the copy of the second original image metadata set is based on an user identifier; and a file management component for managing data storage in order to store each image metadata set in more than one logically partitioned section and in more than one database storage facility, and for directing the image file to an image storage facility.

18. The system of claim 17, wherein the file management component executes a hashing function in order to appropriately direct data to storage.

19. The system of claim 17, further comprising a user information component including an identification mechanism capable off identifying a user through a user identifier.

20. The system of claim 17, wherein each data storage facility includes at least three logically partitioned sections and each image metadata set is stored in three logically partitioned sections.

21. The system of claim 17, wherein the database storage facilities comprise SQL machines.

22. The system of claim 17, further comprising a sharing function for allowing the users to share data with other users.

23. The system of claim 22, further comprising a mechanism for terminating a link in order to stop sharing data with the other users.

24. The system of claim 17, further comprising database storage facilities in disparate locations.

25. A method for storing user data for multiple users using a network storage system, the method comprising:

uploading a data set from a user to the storage system, the data set including an image file;

deriving image metadata from the dataset;

storing the image metadata in logically partitioned sections of database storage facilities, wherein a first original image metadata set is stored in a logically partitioned section of at least one database storage facility and a copy of a second original image metadata set, the second original image metadata set located in another database storage facility, is stored in another logically partitioned section of the at least one database storage facility, such that storing the first original image metadata set and the copy of the second original image metadata is based on an user identifier;

managing the image metadata such that the data set is stored in more than one logically partitioned section and in more than one storage facility; and directing the image file to an alternate storage facility.

26. The method of claim 25, further comprising implementing a hashing function in order to determine an image metadata storage location.

27. The method of claim 25, further comprising performing user verification based on the user identifier.

28. The method of claim 25, further comprising storing the image metadata in three logically partitioned sections.

29. The method of claim 28, further comprising storing a first copy of the image metadata in read/write format and a second copy and a third copy in read-only format.

30. The method of claim 25, further comprising storing the image metadata in SQL machines.

31. The method of claim 25, further comprising implementing a sharing function for allowing the users to share data from the uploaded data set with other users.

32. The method of claim 25, further comprising sending a first version of an encrypted link to initiate sharing.

33. The method of claim 25, further comprising invalidating the first version of the encrypted link in order to terminate sharing.

34. A computer-readable medium having computer-executable instructions for performing the method recited in claim 25.

35. A computer readable medium having computer executable instructions for storing user data for multiple users using a network storage system, the instructions comprising:

uploading a data set from a user to the storage system, the data set including an image file;

deriving image metadata from the dataset;

storing the image metadata in logically partitioned sections of database storage facilities, wherein a first original image metadata is stored in a logically partitioned section of at least one database storage facility and a copy of a second original image metadata, the second original image metadata located in another database storage facility, is stored in another logically partitioned section of the at least one database storage facility, such that storing the first original image metadata and the copy of the second original image metadata is based on an user identifier;

managing the image metadata such that the data set is stored in more than one logically partitioned section and in more than one storage facility; and directing the image file to an alternate storage facility.

* * * * *